(12) United States Patent
Li

(10) Patent No.: US 12,127,139 B2
(45) Date of Patent: Oct. 22, 2024

(54) METHODS AND DEVICES FOR CONFIGURING, SENDING AND RECEIVING DISCOVERY REFERENCE SIGNAL (DRS)

(71) Applicant: BEIJING XIAOMI MOBILE SOFTWARE CO., LTD., Beijing (CN)

(72) Inventor: Mingju Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 448 days.

(21) Appl. No.: 17/421,708

(22) PCT Filed: Jan. 10, 2019

(86) PCT No.: PCT/CN2019/071184
§ 371 (c)(1),
(2) Date: Jul. 8, 2021

(87) PCT Pub. No.: WO2020/142988
PCT Pub. Date: Jul. 16, 2020

(65) Prior Publication Data
US 2022/0086776 A1    Mar. 17, 2022

(51) Int. Cl.
*H04W 56/00* (2009.01)
*H04L 5/00* (2006.01)
*H04W 68/00* (2009.01)

(52) U.S. Cl.
CPC ......... *H04W 56/001* (2013.01); *H04L 5/0051* (2013.01); *H04W 68/005* (2013.01)

(58) Field of Classification Search
CPC . H04W 56/001; H04W 68/005; H04W 52/02; H04W 48/16; H04W 72/0446; H04W 72/1273; H04W 72/23; H04L 5/0051; H04L 5/001; H04L 5/0053; H04L 27/0006; H04L 5/005; H04L 5/0048; H04L 5/0094
See application file for complete search history.

(56) References Cited

U.S. PATENT DOCUMENTS

2018/0084432 A1\* 3/2018 Kwak ............... H04W 74/0808
2018/0241526 A1   8/2018 Chendamarai Kannan et al.
(Continued)

FOREIGN PATENT DOCUMENTS

CN      104968052 A    10/2015
CN      105050190 A    11/2015
(Continued)

OTHER PUBLICATIONS

First Office Action of the Japanese Application No. 2021-539438, issued on Jul. 29, 2022 with English translation,(8p).
(Continued)

*Primary Examiner* — Ivan O Latorre
(74) *Attorney, Agent, or Firm* — Arch & Lake LLP; Hao Tan; Zhangyuan Ji

(57) ABSTRACT

Methods and devices for configuring, sending, and receiving a discovery reference signal (DRS) are provided. The configuration method includes setting the DRS to occupy a first preset number of consecutive time symbols in a time slot,
(Continued)

where the first preset number is no larger than 14. Further, the method includes setting the DRS to include at least one or two synchronization signal blocks (SSBs).

15 Claims, 7 Drawing Sheets

(56) References Cited

U.S. PATENT DOCUMENTS

| | | | |
|---|---|---|---|
| 2018/0242232 A1 | 8/2018 | Chendamarai Kannan et al. | |
| 2018/0242374 A1 | 8/2018 | Harada et al. | |
| 2018/0249497 A1 | 8/2018 | Noh et al. | |
| 2018/0316454 A1 | 11/2018 | Damnjanovic et al. | |
| 2019/0007931 A1 | 1/2019 | Harada et al. | |
| 2019/0191457 A1* | 6/2019 | Si | H04L 5/0082 |
| 2019/0245726 A1* | 8/2019 | Boudreau | H04W 16/14 |
| 2020/0112985 A1 | 4/2020 | Noh et al. | |
| 2020/0187161 A1* | 6/2020 | Wu | H04L 27/2666 |
| 2020/0196306 A1* | 6/2020 | Si | H04L 5/001 |
| 2020/0235832 A1* | 7/2020 | Lee | H04L 27/2602 |
| 2021/0044471 A1* | 2/2021 | Zhou | H04J 11/0086 |
| 2021/0058206 A1* | 2/2021 | Ye | H04L 5/0048 |
| 2022/0248435 A1* | 8/2022 | Lin | H04W 72/1273 |

FOREIGN PATENT DOCUMENTS

| | | |
|---|---|---|
| CN | 105451251 A | 3/2016 |
| CN | 107615698 A | 1/2018 |
| CN | 107682133 A | 2/2018 |
| CN | 107852724 A | 3/2018 |
| CN | 108352958 A | 7/2018 |
| CN | 108513362 A | 9/2018 |
| CN | 108521887 A | 9/2018 |
| CN | 109041199 A | 12/2018 |
| RU | 2651582 C2 | 4/2018 |
| WO | 2016183941 A1 | 11/2016 |
| WO | 2017026434 A1 | 2/2017 |
| WO | 2017030053 A1 | 2/2017 |
| WO | 2018151539 A1 | 8/2018 |

OTHER PUBLICATIONS

Nokia, "On DL Signals and Channels for NR-U", 3GPP TSG RAN WG1 Meeting #95 R1-1812696, Spokane, USA, Nov. 12-16, 2018, (22p).

Xiaomi "SSB transmission in NRU initial access", 3GPP TSG RAN WG1 Meeting #95 R1-1813363, Spokane, USA, Nov. 12-16, 2018, (3p).

International Search Report of PCT Application No. PCT/CN2019/071184 dated Sep. 30, 2019 with English translation (4p).

Written Opinion of the International Search Authority in the International Application No. PCT/CN2019/071184, dated Sep. 30, 2019 with English translation, (5p).

First Office Action of the Chinese Application No. 201980000216.9, issued on May 8, 2021, (26p).

Ericsson, "Reference measurement channel for LAA RRM testing", 3GPP TSG-RAN WG4#78bis R4-161712, <URL: http://www.3gpp.org/ftp/tsg_ran/WG4_Radio/TSGR4_78Bis/Docs/R4-161712.zip>, Apr. 15, 2016, (5p).

Second Office Action of the Japanese Application No. 2021-539438, issued on Feb. 8, 2023, (6p).

Notice of Allowance of the Chinese Application No. 201980000216.9, issued on Nov. 22, 2021, with English translation, (4p).

Extended European Search Report in the European Application No. 19909298.2, mailed on Jan. 31, 2022, (119p).

First Office Action of the Russian Application No. 2021123221, issued on Feb. 17, 2022, with English translation, (13p).

Office Action of the Indian Application No. 202147035024, issued on Mar. 11, 2022, with partial English translation, (6p).

First Office Action of the KR application No. 10-2021-7024951 dated May 3, 2024 with English translation, (12p).

Huawei et al, "Initial access in NR unlicensed," 3GPP TSG RAN WG1, Meeting #95 R1-1812195, Spokane, USA, Nov. 12-16, 2018, (10p).

Qualcomm Incorporated, "DL signals and channels for NR-U," 3GPP TSG RAN WG1, Meeting #95 R1-1813411, Spokane, USA Nov. 12-16, 2018, (8p).

* cited by examiner

METHODS AND DEVICES FOR CONFIGURING, SENDING AND RECEIVING DISCOVERY REFERENCE SIGNAL (DRS)

CROSS-REFERENCE TO RELATED APPLICATION

This is the U.S. national phase application of International Application No. PCT/CN2019/071184, filed on Jan. 10, 2019, the entire contents of which are hereby incorporated by reference for all purposes.

TECHNICAL FIELD

The present disclosure relates to the field of communication, and more particularly to a method and device for setting, transmitting and receiving a discovery signal (DRS).

BACKGROUND

In the 5G New Radio (NR) licensed spectrum, a subframe has a duration of 1 millisecond (ms), a slot includes 14 symbols, and the number of slots includes in one subframe is determined by subcarrier spacing. For example, when the subcarrier spacing is 15 kilohertz (KHz), there is one slot in one subframe, and each slot has a duration of 1 ms; when the subcarrier spacing is 30 KHz, there are two slots in one subframe, and each slot has a duration of 0.5 ms; when the subcarrier spacing is 60 KHz, there are four slots in one subframe, and each slot has a duration of 0.25 ms, and so on.

In the NR, a Synchronization Signal Block (SSB) is proposed to reduce always on reference signal, thereby reducing the overhead.

However, in the New Radio-Unlicensed (NR-U), a base station using an unlicensed spectrum may transmit only a discovery signal (DRS) in some cases to save power. However, at present, there is no definite scheme for the specific content, the corresponding symbol position or the like of the DRS.

SUMMARY

To overcome the problems in the related art, embodiments of the present disclosure provide a method and device for setting a DRS.

According to a first aspect of the present disclosure, a method for setting a DRS is provided. The method includes setting the DRS is to occupy a first preset number of consecutive time symbols within one slot, where the first preset number is no more than 14.

Further, the method includes setting the DRS is to include at least one or two synchronization signal blocks (SSBs).

According to a second aspect of the present disclosure, a method for transmitting a DRS is provided. The DRS may be set using the method of the first aspect. The method for transmitting is applied to a base station in an unlicensed spectrum. The method includes that the base station transmits one or more DRSs to a terminal within a periodic DRS measurement time configuration (DMTC), and DRS transmission time occupied by all DRSs within the DMTC is no more than 5 ms.

According to a third aspect of the present disclosure, a method for receiving a DRS is provided. The DRS may be set using the method of the first aspect. The method for transmitting is applied to a terminal in an unlicensed spectrum.

The method includes that the terminal receives one or more DRSs transmitted by a base station within a periodic DMTC, where DRS transmission time occupied by all the DRSs within the DMTC is no more than 5 milliseconds.

According to a fourth aspect of the present disclosure, a device for setting a DRS is provided. The device includes a processor and memory for storing executable instructions of the processor.

Further, the processor is configured to set the DRS to occupy a first preset number of consecutive time symbols within one slot where the first preset number is no more than 14.

Moreover, the processor configured to set the DRS to include at least one or two SSBs.

It is to be understood that the foregoing general description and the following detailed description are exemplary and explanatory only and not intended to limit the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Exemplary embodiments will be described in detail herein, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods detailed in the appended claims and consistent with some aspects of the disclosure.

Terms used in the present disclosure are only adopted for the purpose of describing specific embodiments and not intended to limit the present disclosure. "A/an", "said" and "the" in a singular form in the present disclosure and the appended claims are also intended to include a plural form, unless other meanings are clearly denoted throughout the present disclosure. It is also to be understood that term "and/or" used in the present disclosure refers to and includes one or any or all possible combinations of multiple associated items that are listed.

It is to be understood that, although terms first, second, third and the like may be adopted to describe various information in the present disclosure, the information should not be limited to these terms. These terms are only adopted to distinguish the information of the same type. For example, without departing from the scope of the present disclosure, first information may also be called second information and, similarly, second information may also be called first information. For example, term "if" used here may be explained as "while" or "when" or "responsive to determining", which depends on the context.

The embodiments of the present disclosure provide a method for setting a discovery signal (DRS). The method for setting the DRS may be written in the communication protocol in advance, so that both a base station and a terminal can transmit or receive the DRS according to the method for setting the DRS.

Figure 1:
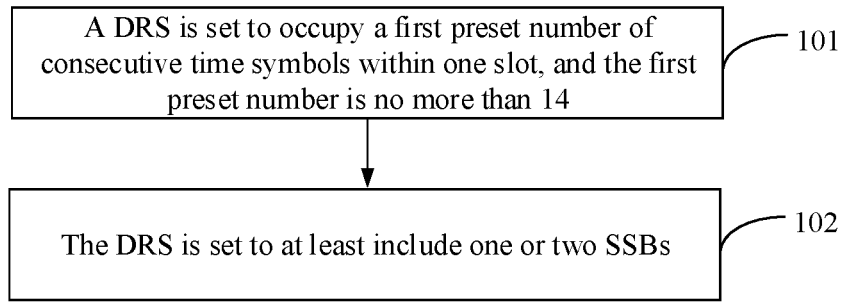
FIG. 1 is a flowchart of a method for setting a discovery signal (DRS) according to an exemplary embodiment.

Referring to a flowchart of a method for setting a DRS according to an exemplary embodiment shown in FIG. 1, the method may include the following operations.

In 101, the DRS is set to occupy a first preset number of consecutive time symbols within one slot, and the first preset number is no more than 14.

In 102, the DRS is set to at least include one or two synchronization signal blocks (SSBs).

In the above embodiment, when the DRS is set, the DRS may occupy the first preset number of consecutive time symbols within one slot, and the first preset number is no more than 14. Meanwhile, the DRS is set to at least include one or two SSBs. By the above procedure, the method for setting the DRS in the unlicensed spectrum is provided.

For the operation in 101, a total number of time symbols occupied by one slot are 14, so the first preset number is no more than 14. In the embodiments of the present disclosure, the DRS cannot span slots, but only can occupy the first preset number of consecutive symbols within the same slot.

For the operation in 102, the DRS at least includes the SSBs, and each SSB occupies four consecutive time symbols in the DRS. In the embodiments of the present disclosure, the DRS may include one or two SSBs. when a cell transmitting the DRS is a non-standalone cell, the DRS only needs to include an SSB, or the DRS includes the SSBs and a Non-Zero Power Channel State Information-Reference Signal (NZP CSI-RS), the DRS may include two SSBs, and the two SSBs may be continuous or discontinuous.

The contents included in each SSB occupy four consecutive symbols, and the contents of each symbol are Primary Synchronization Signal (PSS), Physical Broadcast Channel (PBCH), Secondary Synchronization Signal (SSS)+PBCH (the SSS and the PBCH are frequency division multiplexed on this symbol), and PBCH in order of time.

A symbol occupied by the PBCH transmits a demodulation reference signal (DMRS) for PBCH demodulation simultaneously, and the DMRS and the PBCH are frequency division multiplexed. For a time symbol occupied by the SSS, 12 resource blocks (RBs) in the middle of the time symbol may be used to transmit the contents corresponding to the SSS, and 4 RBs on each side may be used to transmit the PBCH. Of course, the PBCH in the SSS may also be frequency division multiplexed with the DMRS.

In one embodiment, the DRS may also include a second preset number of NZP CSI-RSs, and each NZP CSI-RS may occupy one time symbol. In one example, the second preset number is any integer value between 1 and 10. That is, one DRS may include 1 to 10 NZP CSI-RSs.

In the above embodiment, in the unlicensed spectrum, when the NZP CSI-RSs are also included in the DRS, the number of symbols occupied by each NZP CSI-RS included in the DRS and a number of NZP CSI-RSs included in one DRS are set, so that the availability is high.

In one embodiment, when a unlicensed spectrum cell where the terminal is located is a non-standalone cell, the terminal may directly perform random access according to other licensed spectrum cells, and it is unnecessary to set the DRS to include a Remaining minimum system information-Control Resource Set (RMSI-CORESET) and a RMSI-physical downlink shared channel (RMSI-PDSCH). When the unlicensed spectrum cell where the terminal is located is a standalone cell, the terminal cannot perform random access according to other licensed cells, and then it is necessary to set the DRS to include the RMSI-CORESET and the RMSI-PDSCH in the DRS.

The RMSI-CORESET is used to transmit a physical downlink control channel (PDCCH), and downlink control information (DCI) carried by the PDCCH is used to inform the terminal of a time frequency resource used by the PDSCH carrying RMSI, and the like. Each RMSI-CORESET corresponds to an SSB, and configuration information of time frequency resource location of the RMSI-CORESET corresponding to each SSB is notified to the terminal through broadcast information in the PBCH in the SSB.

The RMSI-PDSCH is a PDSCH carrying RMSI, and the RMSI is used to inform the terminal of a time frequency code resource to be used when random access is performed, and the like.

In the embodiments of the present disclosure, one RMSI-CORESET occupies a third preset number of consecutive time symbols in the DRS. In one example, the third preset number may be any integer value between 1 and 3. In the embodiments of the present disclosure, in one example, the third preset number may be 1, 2 or 3. That is, one RMSI-CORESET occupies only one time symbol, or two consecutive time symbols, or three consecutive time symbols in the DRS.

One RMSI-PDSCH occupies a fourth preset number of consecutive time symbols in the DRS. In one example, the fourth preset number may be any integer value between 2 and 10. In the embodiments of the present disclosure, the fourth preset number may be 2 or 4. That is, one RMSI-PDSCH may occupy two consecutive time symbols or four consecutive time symbols in the DRS.

It is to be noted that in one DRS, the RMSI-CORESET and the RMSI-PDSCH are included at the same time or not included at the same time. There is no case that the DRS includes the RMSI-CORESET without the RMSI-PDSCH, or the DRS includes the RMSI-PDSCH without the RMSI-CORESET.

When a DRS includes the RMSI-CORESET and the RMSI-PDSCH, the DRS includes only one SSB and one RMSI-CORESET and RMSI-PDSCH corresponding to the SSB.

In the above embodiment, the number of RMSI-CORESETs and RMSI-PDSCHs included in the DRS are set, and the number of time symbols occupied by each of the above information is set, so that the availability is high.

In one embodiment, when the terminal requests the base station for an Other System Information (OSI), the base station needs to transmit the OSI to the terminal, then the DRS may include the OSI.

In the embodiments of the present disclosure, one OSI occupies a fifth preset number of consecutive time symbols in the DRS. In one example, the fifth preset number may also be any integer value between 2 and 10. In the embodiments of the present disclosure, the fifth preset number may be 2 or 4. That is, one OSI occupies two consecutive time symbols or four consecutive time symbols in the DRS.

In the above embodiment, the number of OSI included in the DRS is set, and the number of time symbols occupied by the above information is set, so that the availability is high.

In one embodiment, paging information occurs periodically. When time at which the paging information occurs coincides with time corresponding to the DRS, the DRS also needs to include the paging information.

In the embodiments of the present disclosure, one piece of paging information occupies a sixth preset number of consecutive time symbols in the DRS. In one example, the sixth preset number may be any integer value between 2 and 10. In the embodiments of the present disclosure, the sixth preset number may be 2 or 4. That is, one piece of paging information occupies two consecutive time symbols or four consecutive time symbols in the DRS.

In the above embodiment, the number of paging information included in the DRS is set, and the number of time symbols occupied by the above information is set, so that the availability is high.

In one embodiment, when each DRS includes RMSI-CORESET and RMSI-PDSCH, a last time symbol occupied by the RMSI-CORESET is located before a first time symbol occupied by the RMSI-PDSCH in the DRS. That is, the RMSI-CORESET is located before the RMSI-PDSCH.

Further, the last time symbol occupied by the RMSI-CORESET is located before a first time symbol occupied by a corresponding SSB; or a first time symbol occupied by the RMSI-CORESET is located after a last time symbol occupied by the corresponding SSB. That is, the RMSI-CORESET may be located before or after the corresponding SSB.

In the above embodiment, an order for transmitting the RMSI-CORESET and the RMSI-PDSCH and an order for transmitting the RMSI-CORESET and the corresponding SSB are determined based on the number of time symbols occupied by each information content and the function of each information content, and the like.

In one embodiment, when each DRS includes RMSI-CORESET and RMSI-PDSCH and also includes OSI, a last time symbol occupied by the RMSI-PDSCH is located before a first time symbol occupied by the OSI, that is, the RMSI-PDSCH is located before the OSI.

When a DRS includes RMSI-CORESET and RMSI-PDSCH and also includes paging information, a last time symbol occupied by the RMSI-PDSCH is located before a first time symbol occupied by the paging information, that is, the RMSI-PDSCH is located before the paging information.

When a DRS includes RMSI-CORESET and RMSI-PDSCH, and also includes OSI and paging information, the RMSI-PDSCH is located before the OSI and the paging information.

In the above embodiment, when the DRS includes not only the RMSI-CORESET and the RMSI-PDSCH, but also the OSI and/or the paging information, an order corresponding to the different information contents is further set.

In one embodiment, the NZP CSI-RS may be used to occupy the channel and improve the measurement accuracy of the DRS.

For example, when it is detected at a time symbol #1 of a slot that the channel is idle, but the base station transmits the SSB from a time symbol #2, there is only one time symbol, that is, the time symbol #1 may be used to transmit the RMSI-CORESET, however, the RMSI-CORESET needs to occupy two time symbols. In this case, the RMSI-CORESET may be transmitted only after the SSB, so the NZP CSI-RS may be used to occupy the time symbol #1, thus achieving the purpose of occupying the channel.

For another example, if transmission between the base station and the terminal is not based on beams, the base station may perform omnidirectional channel detection, the transmission of the subsequent slot may follow continuous transmission of the DRS in the first slot, and channel detection may not be required before each subsequent transmission of the DRS.

To ensure transmission continuity, when the DRS occupies only a time symbol #12, the NZP CSI-RS may be used to occupy the channel at a time symbol #13, and a next slot is waited for to start transmission of a next DRS. When the next DRS does not start from a symbol #0, the symbol #0 also needs to occupy the channel using the NZP CSI-RS.

For another example, when the unlicensed spectrum cell for transmitting the DRS is a non-standalone cell, only the SSB is required to be transmitted in the DRS, without requiring other contents. In order to improve the measurement accuracy of the DRS, all time symbols, except the time symbols occupied by the SSB, in the first preset number of consecutive time symbols used for transmitting the DRS in the slot are used to carry the NZP CSI-RS.

The above embodiments are further illustrated as follows.

When the DRS includes an SSB, and also includes RMSI-CORESET, RMSI-PDSCH, OSI and paging information, the transmission order corresponding to different contents in the DRS includes, but not limited to, the following:
  SSB-RMSI-CORESET-RMSI-PDSCH-OSI-paging information; or
  RMSI-CORESET-SSB-RMSI-PDSCH-OSI-paging information; or
  RMSI-CORESET-RMSI-PDSCH-SSB-OSI-paging information.

When the number of time symbols occupied by the above content does not reach the first preset number, the NZP CSI-RSs may be filled in unoccupied time symbols, and an order may be as follows:
  (NZP CSI-RS-) SSB-RMSI-CORESET-RMSI-PDSCH-OSI-paging information (-NZP CSI-RS); or
  (NZP CSI-RS-) RMSI-CORESET-SSB-RMSI-PDSCH-OSI-paging information (-NZP CSI-RS); or
  (NZP CSI-RS-) RMSI-CORESET-RMSI-PDSCH-SSB-OSI-paging information (-NZP CSI-RS).

The NZP CSI-RSs may be filled not only in the time symbols of the most front end and the last end of the DRS as described above, but also filled in the time symbols of the middle of the DRS, which is not limited herein.

In the above embodiment, the channel may be occupied by the NZP CSI-RSs in the unlicensed spectrum, and the measurement accuracy of the DRS received at the terminal side is improved.

The embodiments of the present disclosure further provide a method for transmitting a DRS. The method may be applied to a base station in an unlicensed spectrum. The base station sets the DRS by using the above method for setting the DRS. The method for transmitting the DRS may include the following operations.

In 201, one or more DRSs are transmitted to a terminal within a periodic DRS measurement time configuration (DMTC), and DRS transmission time occupied by all the DRSs within the DMTC is no more than 5 milliseconds.

In the above embodiment, the base station in the unlicensed spectrum may transmit one or more DRSs to the terminal within the periodic DMTC, and the DRS transmission time occupied by all of the DRSs within the DMTC is no more than 5 milliseconds. Through the above procedure, the base station in the unlicensed spectrum may transmit the DRS periodically, thereby saving energy of the base station on the basis of ensuring that the terminal is able to acquire the DRS.

For the above operation in 201, the period of DRS measurement time configuration (DMTC) may be 40 ms, 80 ms, 160 ms. The duration length of the DMTC is 6 ms, which occupies five complete subframes. Each subframe has a duration of 1 ms, and the DRS transmission time is no more than 5 ms accordingly. Each DRS transmitted by the base station may be set using the method for setting the DRS provided in the embodiments of the present disclosure, which are not elaborated herein.

Figure 2:
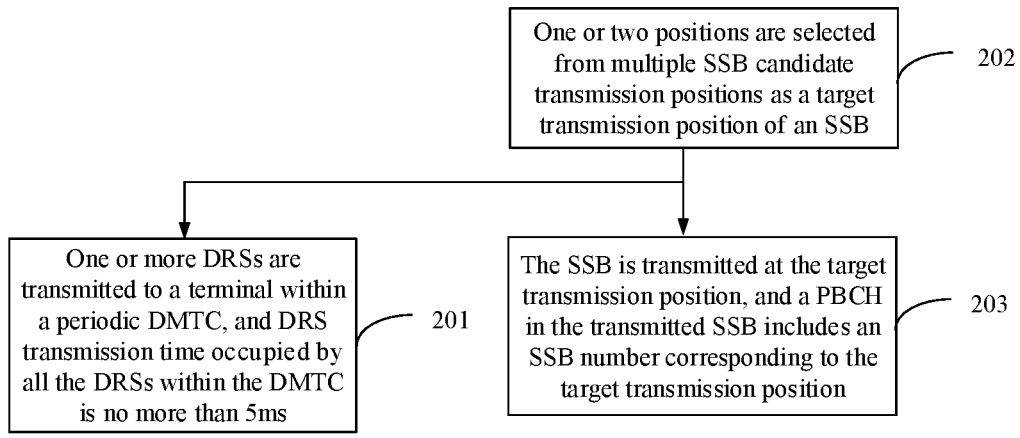
FIG. 2 is a flowchart of a method for transmitting a DRS according to an exemplary embodiment.

In one embodiment, referring to FIG. 2, FIG. 2 is a flowchart of another method for transmitting a DRS according to an embodiment, and the method further includes the following operations.

In 202, one or two positions are selected from multiple SSB candidate transmission positions as a target transmission position of an SSB.

In the operation, there may be multiple SSB candidate transmission positions in the slot occupied by each DRS. For example, the candidate initial transmission symbols of the SSB may be symbol #0 to symbol #10. Because each SSB occupies four consecutive symbols, multiple candidate transmission positions of the SSB in one slot may be symbol #i to symbol #i+3, where the value of i is an integer between 0 and 10. When a channel is detected to be idle before symbol #0 of a certain slot, there are 11 candidate transmission positions for the SSB in the DRS within the slot. When the channel is detected to be idle before symbol #1 of a certain slot, there are 10 candidate transmission positions for the SSB in the DRS within the slot . . . decreasing in turn. When the channel is detected to be idle only before symbol #10 of a certain slot, there is only one candidate transmission position for the SSB in the DRS within the slot, that is, symbol #10 to symbol #13.

The base station may select one or two positions from the multiple SSB candidate transmission positions as the target transmission position for the SSB.

For example, when one SSB is included in a DRS to be transmitted by the base station, time symbol #2 to time symbol #5 may be selected from multiple SSB candidate transmission positions as the target transmission position of the SSB. When two SSBs are included in the DRS to be transmitted by the base station, time symbol #2 to time symbol #5 and time symbol #8 to time symbol #11 may be selected from the multiple SSB candidate transmission positions as the target transmission positions of the two SSBs, and time symbol #4 to time symbol #7 and time symbol #8 to time symbol #11 may be selected from the multiple SSB candidate transmission positions as the target transmission positions of the two SSBs.

In 203, the SSB is transmitted at the target transmission position, and a PBCH in the transmitted SSB includes an SSB number corresponding to the target transmission position.

In the operation, the base station transmits the SSB at the previously determined target transmission position, and the PBCH in the transmitted SSB also needs to include the SSB number corresponding to the target transmission position, that is, an index corresponding to the SSB is transmitted through the PBCH in the SSB.

For example, when the subcarrier spacing is 15 KHz, there are five complete subframes within 5 ms of the DRS transmission time, and each subframe includes one slot. In the first slot, there are 11 SSB candidate transmission positions, the initial transmission symbol of SSB is symbol #i, where the value of i is an integer between 0 and 10, and the SSB number is SSB #i. In the second slot, the initial transmission symbol of SSB is symbol #i, and the SSB number is SSB # (11+i). In the Nth slot, the initial transmission symbol of SSB is symbol #and the SSB number is SSB # ((N−1)×11+i), and the value of N is 1, 2, 3, 4, or 5.

The above embodiments are further illustrated as follows.

When the subcarrier spacing is 15 KHz, one DMTC duration (i.e., 6 ms) at least includes five complete subframes (i.e., 5 ms), and each subframe includes one slot. Each slot has a duration of 1 ms and includes 14 symbols. At most one DRS is transmitted in each slot, and at most five DRSs are transmitted within the DRS transmission time.

The SSB in the DRS in each slot has multiple candidate transmission positions.

For example, the DRS occupies 13 symbols, the candidate transmission positions of the DRS in one slot are as the following: candidate position 1 with time symbol #0 to time symbol #12, and correspondingly, the SSB also has multiple SSB candidate transmission positions, and the candidate initial symbol positions are symbol #0 to symbol #9; and candidate position 2 with time symbol #1 to time symbol #13, and correspondingly, the SSB also has multiple SSB candidate transmission positions, and the candidate initial symbol positions are symbol #1 to symbol #10.

For multiple SSB candidate transmission positions, one or two positions are selected as the target transmission positions of the SSBs, and PBCH in each SSB carries the corresponding SSB number, so as to facilitate the terminal to realize downlink time domain synchronization. For example, PSS-PBCH-SSS-PBCH of the SSB occupies time symbol #2 to time symbol #5 or time symbol #8 to time symbol #11. And the PBCH carries an SSB number corresponding to the target transmission position, that is, an SSB index, which corresponds to the time domain position in the DMTC occupied by the SSB one to one.

When the subcarrier spacing is 30 KHz, one DMTC duration (i.e., 6 ms) at least includes five complete subframes (i.e., 5 ms), and each subframe includes two slots. Each slot has a duration of 0.5 ms and includes 14 symbols. At most one DRS is transmitted in each slot, and at most ten DRSs are transmitted within the DRS transmission time. When the number of time symbols occupied by each DRS is no more than 14, the DRS in one slot also has multiple candidate transmission positions. In the candidate transmission positions of each DRS, the SSB also has multiple SSB candidate transmission positions correspondingly. Time symbol #2 to time symbol #5 or time symbol #8 to time symbol #11 may also be taken as the target transmission position of the SSB. And the PBCH carries the SSB number corresponding to the target transmission position, that is, the SSB index.

In addition, in the embodiments of the present disclosure, the target transmission position where the SSB are located is not limited to time symbol #2 to time symbol #5, or time symbol #8 to time symbol #11, but may also be other transmission positions, for example, time symbol #3 to time symbol #6, which is not limited in the present disclosure.

In the above embodiment, the base station may select one or two positions from the multiple SSB candidate positions as the target transmission position of the SSB. Further, the SSB in the DRS is transmitted at the target transmission position, and the PBCH in the transmitted SSB includes the SSB number corresponding to the target transmission position, thereby ensuring downlink time domain synchronization of the terminal.

Figure 3:
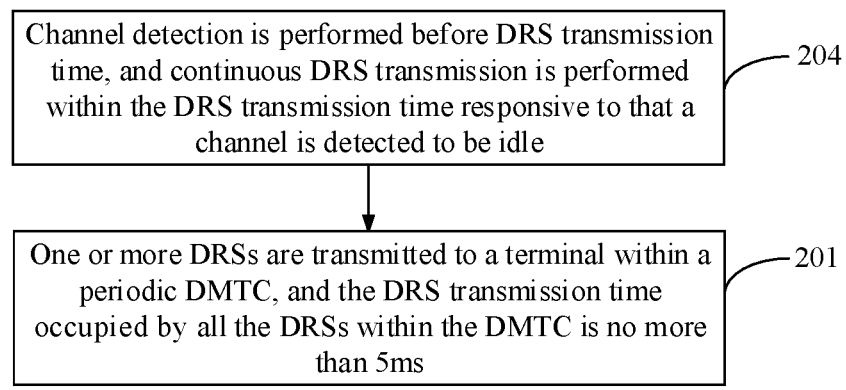
FIG. 3 is a flowchart of another method for transmitting a DRS according to an exemplary embodiment.

In one embodiment, referring to FIG. 3, FIG. 3 is a flowchart of another method for transmitting a DRS according to an embodiment, and the method further includes the following operations.

In 204, channel detection is performed before the DRS transmission time, and continuous DRS transmission is performed within the DRS transmission time responsive to that a channel is detected to be idle.

This operation may be performed before the operation in 201. Before the base station starts transmitting the DRS within the DMTC, channel detection may be performed through Listen Before Talk (LBT). One or more DRSs start to be transmitted responsive to that the channel is detected to be idle.

Figure 4:
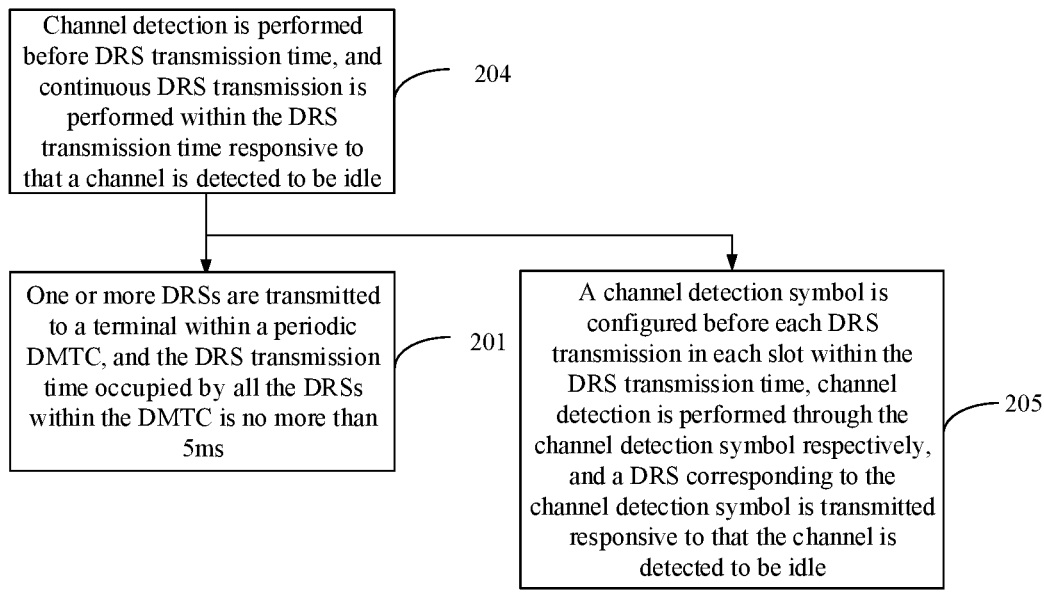
FIG. 4 is a flowchart of another method for transmitting a DRS according to an exemplary embodiment.

In one embodiment, referring to FIG. 4, FIG. 4 is a flowchart of another method for transmitting a DRS according to the embodiment shown in FIG. 3, the method further includes the following operations.

In 205, a channel detection symbol is configured before each DRS transmission in each slot within the DRS transmission time, channel detection is performed through the channel detection symbol respectively, and a DRS corresponding to the channel detection symbol is transmitted responsive to that the channel is detected to be idle.

In the operation, when the DRS to be transmitted at each slot corresponds to different beam directions, the base station may, in addition to performing channel detection before the transmission of the first DRS, configure the channel detection symbol before the transmission of each DRS in each time slot within the DRS transmission time, and perform channel detection in the LBT manner through the channel detection symbol. The DRS corresponding to the channel detection symbol is transmitted responsive to that the channel is detected to be idle.

That is, the number of time symbols occupied by the DRS is at most 13, and one time symbol needs to be used as the channel detection symbol to detect whether the channel is idle.

In the above embodiment, the base station may perform channel detection before the DRS transmission time, and perform continuous DRS transmission within the DRS transmission time responsive to that the channel is detected to be idle. Further, the base station may configure the channel detection symbol before each DRS transmission in each time slot within the DRS transmission time, perform channel detection through the channel detection symbol respectively, and transmit the DRS corresponding to the channel detection symbol responsive to that the channel is detected to be idle. Therefore, it is ensured that the DRS may be transmitted to the terminal when the channel is idle.

The embodiments of the present disclosure provide a method for receiving a DRS. The method may be applied to a terminal in an unlicensed spectrum, and may include the following operations.

In 301, one or more DRSs transmitted by a base station within a periodic DMTC are received, and DRS transmission time occupied by all the DRSs within the DMTC is no more than 5 milliseconds.

In the above embodiment, the terminal may receive one or more DRSs transmitted by the base station within the periodic DMTC, and the DRS transmission time occupied by all the DRSs within the DMTC is no more than 5 milliseconds, thereby saving energy of the base station on the basis of ensuring that the terminal is able to acquire the DRS.

For the operation in 301, the base station in the unlicensed spectrum transmits the DRS periodically, and then the terminal receives one or more DRSs transmitted by the base station within the periodic DMTC. Each DRS transmitted by the base station may be set using the method for setting the DRS provided by the embodiments of the present disclosure.

Figure 5:
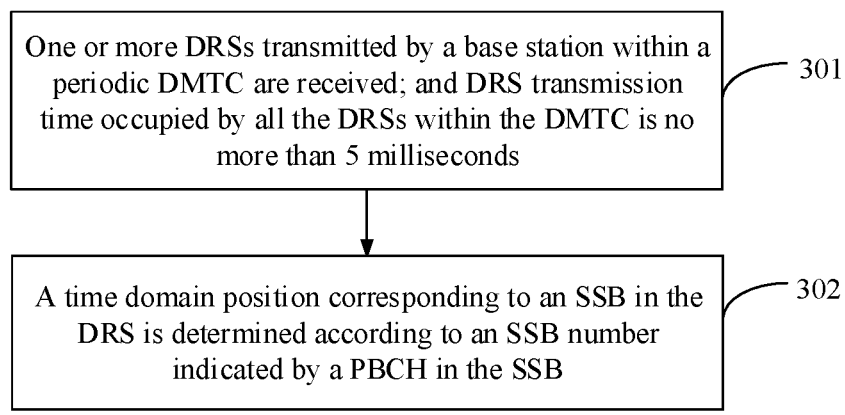
FIG. 5 is a flowchart of a method for receiving a DRS according to an exemplary embodiment.

In one embodiment, referring to FIG. 5, FIG. 5 is a flowchart of a method for receiving a DRS according to an embodiment. The method further includes the following operations.

In 302, a time domain position corresponding to an SSB in the DRS is determined according to an SSB number indicated by a PBCH in the SSB.

The operation in 302 may be performed after the operation in 301. After the terminal receives the DRS, the terminal may determine the time domain position corresponding to the SSB in the DRS according to the SSB number (i.e., the SSB index) indicated by the PBCH in the SSB, so as to acquire downlink time domain synchronization.

In the above embodiment, the terminal may determine the time domain position of the SSB in the DRS according to the SSB number indicated by the PBCH in the SSB, thereby achieving downlink time domain synchronization, which is simple and convenient to implement and has the high availability.

Figure 6:
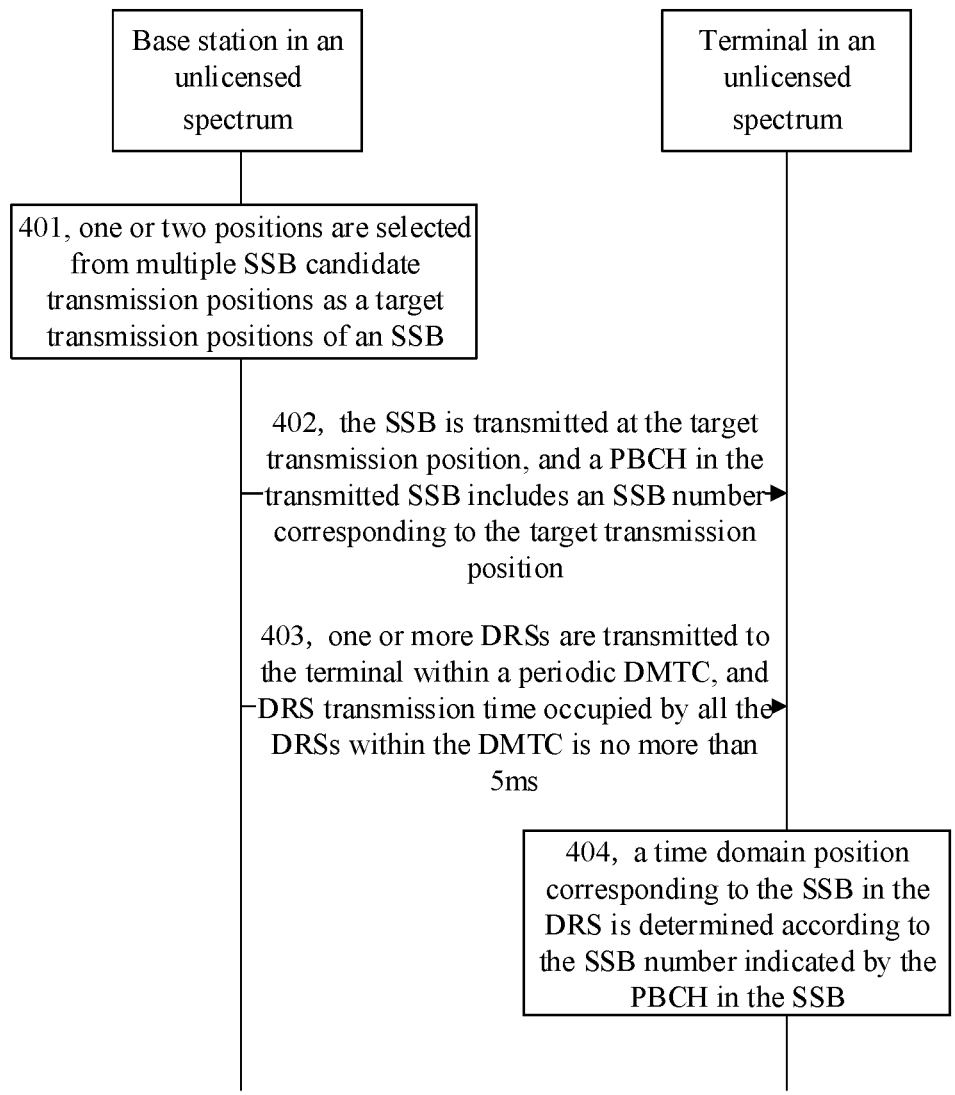
FIG. 6 is a flowchart of a method for transmitting and receiving a DRS according to an exemplary embodiment.

Referring to FIG. 6, FIG. 6 is a flowchart of a method for transmitting and receiving a DRS according to an embodiment, which includes the following operations.

In 401, a base station in an unlicensed spectrum selects one or two positions from multiple SSB candidate transmission positions as a target transmission position of an SSB.

In 402, the base station transmits the SSB at the target transmission position, and a PBCH in the transmitted SSB includes an SSB number corresponding to the target transmission position.

In 403, the base station transmits one or more DRSs to a terminal within a periodic DMTC, and DRS transmission time occupied by all the DRSs within the DMTC is no more than 5 milliseconds.

The operation in 402 may be performed in synchronization with the operation in 403.

Other contents in the DRS except SSB may be set using the method for setting the DRS provided in the embodiments of the present disclosure. Details are not described herein, which facilitate the terminal side to acquire all contents in the DRS based on the same method for setting the DRS after receiving the DRS.

In addition, in the embodiments of the present disclosure, channel detection may be performed firstly before the base station transmits the DRS. When a channel is detected to be idle, continuous DRS transmission is performed within the DRS transmission time. Further, a channel detection symbol may be configured before each DRS transmission in each time slot within the DRS transmission time. Channel detection is performed through the channel detection symbol respectively, and when the channel is detected to be idle, a DRS corresponding to the channel detection symbol is transmitted.

In 404, the terminal determines a time domain position corresponding to the SSB in the DRS according to the SSB number indicated by the PBCH in the SSB.

Other contents in the DRS except the SSB may be acquired according to the method for setting the DRS previously provided in the embodiments of the present disclosure.

For example, a RMSI-CORESET may be located before or after a corresponding SSB, and occupy 2 or 4 consecutive time symbols. The RMSI-CORESET is located before a RMSI-PDSCH, and the RMSI-PDSCH occupies 2 or 4 consecutive time symbols, etc.

The above embodiments provide a method for setting a DRS in an unlicensed spectrum. Further, a base station and a terminal in the unlicensed spectrum may transmit and receive a DRS based on the method for setting DRS, thereby saving the energy of the base station and ensuring that the terminal realizes downlink time domain synchronization and obtains uplink random access information, or the like.

Corresponding to the foregoing embodiments of the application function implementation method, the present disclosure also provides embodiments of the application function implementation device, the corresponding base station and terminal.

Figure 7:
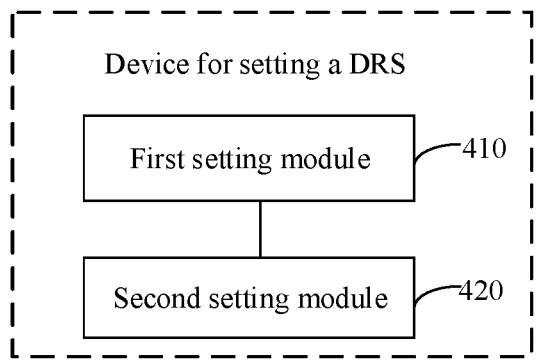
FIG. 7 is a block diagram of a device for setting a DRS according to an exemplary embodiment.

Referring to FIG. 7, FIG. 7 is a block diagram of a device for setting a DRS according to an exemplary embodiment. The device includes a first setting module 410 and a second setting module 420.

The first setting module 410 is configured to set the DRS to occupy a first preset number of consecutive time symbols within one slot, and the first preset number is no more than 14.

The second setting module 420 is configured to set the DRS to at least include one or two SSBs.

In one example, each SSB occupies four consecutive time symbols in the DRS.

In one example, the DRS further includes a second preset number of NZP CSI-RSs, and each NZP CSI-RS occupies one time symbol in the DRS. The second preset number is any integer value between 1 and 10.

In one example, the DRS further includes a RMSI-CORESET and a RMSI-PDSCH, the RMSI-CORESET occupies a third preset number of consecutive time symbols in the DRS and the RMSI-PDSCH occupies a fourth preset number of consecutive time symbols in the DRS.

The third preset number is any integer value between 1 and 3, and the fourth preset number is any integer value between 2 and 10.

In one example, the fourth preset number is 2 or 4.

In one example, a last time symbol occupied by the RMSI-CORESET is located before a first time symbol occupied by the RMSI-PDSCH.

In one example, the last time symbol occupied by the RMSI-CORESET is located before a first time symbol occupied by a corresponding SSB; or a first time symbol occupied by the RMSI-CORESET is located after a last time symbol occupied by the corresponding SSB.

In one example, the DRS further includes OSI, and the OSI occupies a fifth preset number of consecutive time symbols in the DRS; and/or the DRS further includes paging information, and the paging information occupies a sixth preset number of consecutive time symbols in the DRS.

The fifth preset number is any integer value between 2 and 10, and the sixth preset number is any integer value between 2 and 10.

In one example, the fifth preset number is 2 or 4, and the sixth preset number is 2 or 4.

In one example, a last time symbol occupied by the RMSI-PDSCH is located before a first time symbol occupied by the OSI; and/or the last time symbol occupied by the RMSI-PDSCH is located before a first time symbol occupied by the paging information.

Figure 8:
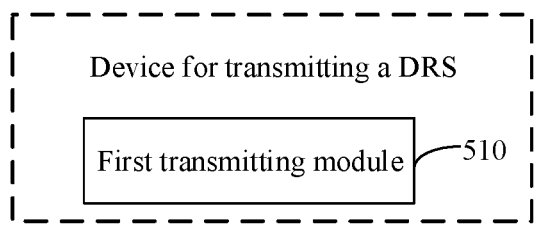
FIG. 8 is a block diagram of a device for transmitting a DRS according to an exemplary embodiment.

Referring to FIG. 8, FIG. 8 is a block diagram of a device for transmitting a DRS according to an exemplary embodiment. The device is applied to a base station in an unlicensed spectrum and includes a first transmitting module 510.

The first transmitting module 510 is configured to transmit one or more DRSs to a terminal within a periodic DMTC, and DRS transmission time occupied by all the DRSs within the DMTC is no more than 5 milliseconds.

Figure 9:
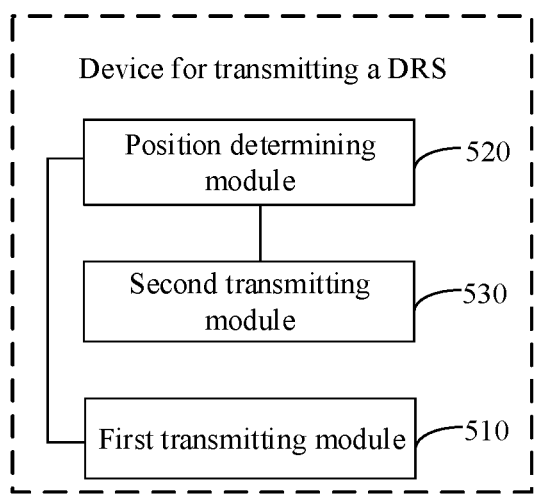
FIG. 9 is a block diagram of another device for transmitting a DRS according to an exemplary embodiment.

Referring to FIG. 9, FIG. 9 is a block diagram of another device for transmitting a DRS on the basis of the embodiment shown in FIG. 8, and the device further includes a position determining module 520 and a second transmitting module 530.

The position determining module 520 is configured to select one or two positions from multiple SSB candidate transmission positions as a target transmission position of an SSB.

The second transmitting module 530 is configured to transmit the SSB at the target transmission position, and a PBCH in the transmitted SSB includes an SSB number corresponding to the target transmission position.

Figure 10:
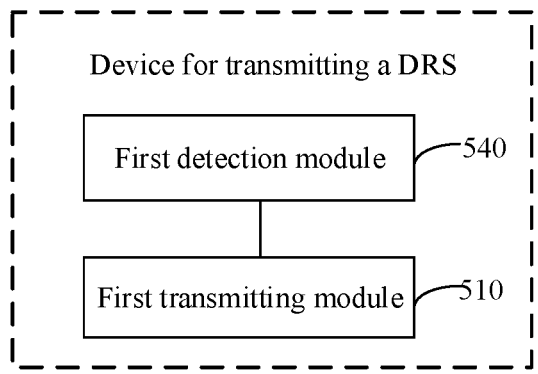
FIG. 10 is a block diagram of another device for transmitting a DRS according to an exemplary embodiment.

Referring to FIG. 10, FIG. 10 is a block diagram of another device for transmitting a DRS on the basis of the embodiment shown in FIG. 8, and the device further includes a first detection module 540.

The first detection module 540 is configured to perform channel detection before the DRS transmission time, and perform continuous DRS transmission within the DRS transmission time responsive to that a channel is detected to be idle.

Figure 11:
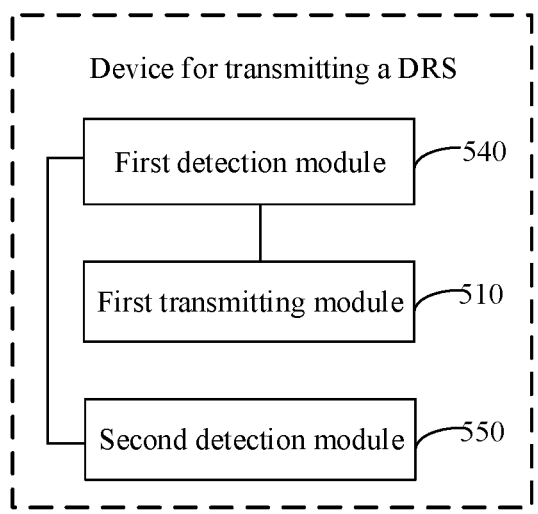
FIG. 11 is a block diagram of another device for transmitting a DRS according to an exemplary embodiment.

Referring to FIG. 11, FIG. 11 is a block diagram of another device for transmitting a DRS on the basis of the embodiment shown in FIG. 10, and the device further includes a second detection module 550.

The second detection module 550 is configured to configure a channel detection symbol before each DRS transmission in each slot within the DRS transmission time, perform channel detection through the channel detection symbol respectively, and transmit a DRS corresponding to the channel detection symbol responsive to that the channel is detected to be idle.

Figure 12:
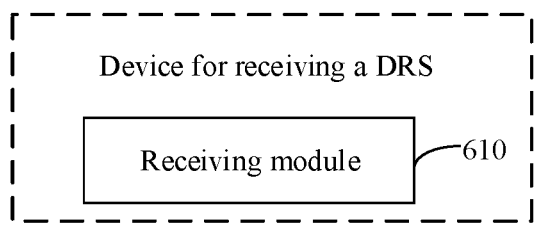
FIG. 12 is a block diagram of a device for receiving a DRS according to an exemplary embodiment.

Referring to FIG. 12, FIG. 12 is a block diagram of a device for receiving a DRS according to an exemplary embodiment. The device is applied to a terminal in an unlicensed spectrum and includes a receiving module 610.

The receiving module 610 is configured to receive one or more DRSs transmitted by a base station within a periodic DMTC. DRS transmission time occupied by all the DRSs within the DMTC is no more than 5 milliseconds.

Figure 13:
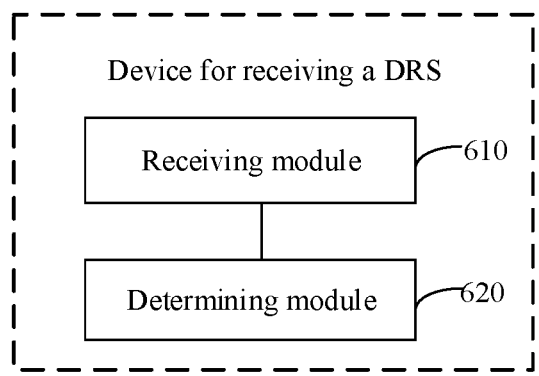
FIG. 13 is a block diagram of another device for receiving a DRS according to an exemplary embodiment.

Referring to FIG. 13, FIG. 13 is a block diagram of another device for receiving a DRS on the basis of the embodiment shown in FIG. 12, and the device further includes a determining module 620.

The determining module 620 is configured to determine a time domain position corresponding to an SSB in the DRS according to an SSB number indicated by a PBCH in the SSB.

The device embodiments substantially correspond to the method embodiments, and thus related parts refer to part of descriptions of the method embodiments. The device embodiments described above are only schematic, units described as separate parts therein may or may not be physically separated, and parts displayed as units may or may not be physical units, and namely may be located in the same place or may also be distributed to multiple network units. Part or all of the modules therein may be selected according to a practical requirement to achieve the purpose of the solutions of the present disclosure. Those of ordinary skill in the art may understand and implement the solutions without creative work.

Correspondingly, the present disclosure also provides a computer-readable storage medium having stored a computer program thereon, which is used to execute the method for setting a DRS described above.

Correspondingly, the present disclosure also provides a computer readable storage medium having stored a computer program thereon, which is used to execute the method for transmitting a DRS described above.

Correspondingly, the present disclosure also provides a computer readable storage medium having stored a computer program thereon, which is used to execute the method for receiving a DRS described above.

Correspondingly, the present disclosure also provides a device for setting a DRS, which includes:
a processor; and
a memory for storing instructions executable by the processor.
The processor is configured to:
set the DRS to occupy a first preset number of consecutive time symbols within one slot, where the first preset number is no more than 14; and
set the DRS to at least include one or two SSBs.

Correspondingly, the present disclosure also provides a device for transmitting a DRS, which is applied to a base station in an unlicensed spectrum and includes:
a processor; and
a memory for storing instructions executable by the processor.
The processor is configured to:
transmit one or more DRSs to a terminal within a periodic DMTC, and DRS transmission time occupied by all the DRSs within the DMTC is no more than 5 milliseconds.

Figure 14:
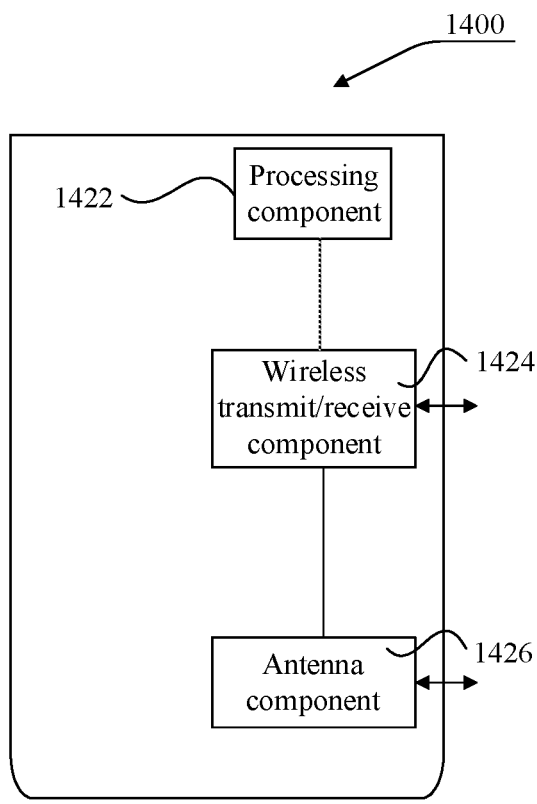
FIG. 14 is a schematic structure diagram of a device for transmitting a DRS according to an exemplary embodiment of the present disclosure.

As shown in FIG. 14, FIG. 14 is a schematic structure diagram of a device 1400 for transmitting a DRS according to an exemplary embodiment. The device 1400 may be provided as a base station. Referring to FIG. 14, the device 1400 includes a processing component 1422, a wireless transmit/receive component 1424, an antenna component 1426, and a signal processing portion specific to the wireless interface. The processing component 1422 may further include one or more processors, One of the processors in the processing component 1422 may be configured to perform the above method for transmitting a DRS applied to the base station side in the unlicensed spectrum.

Correspondingly, the present disclosure also provides a device for receiving a DRS, which is applied to a terminal in an unlicensed spectrum and includes:
a processor; and
a memory for storing instructions executable by the processor.
The processor is configured to:
receive one or more DRSs transmitted by a base station within a periodic DMTC. DRS transmission time occupied by all the DRSs within the DMTC is no more than 5 milliseconds.

Figure 15:
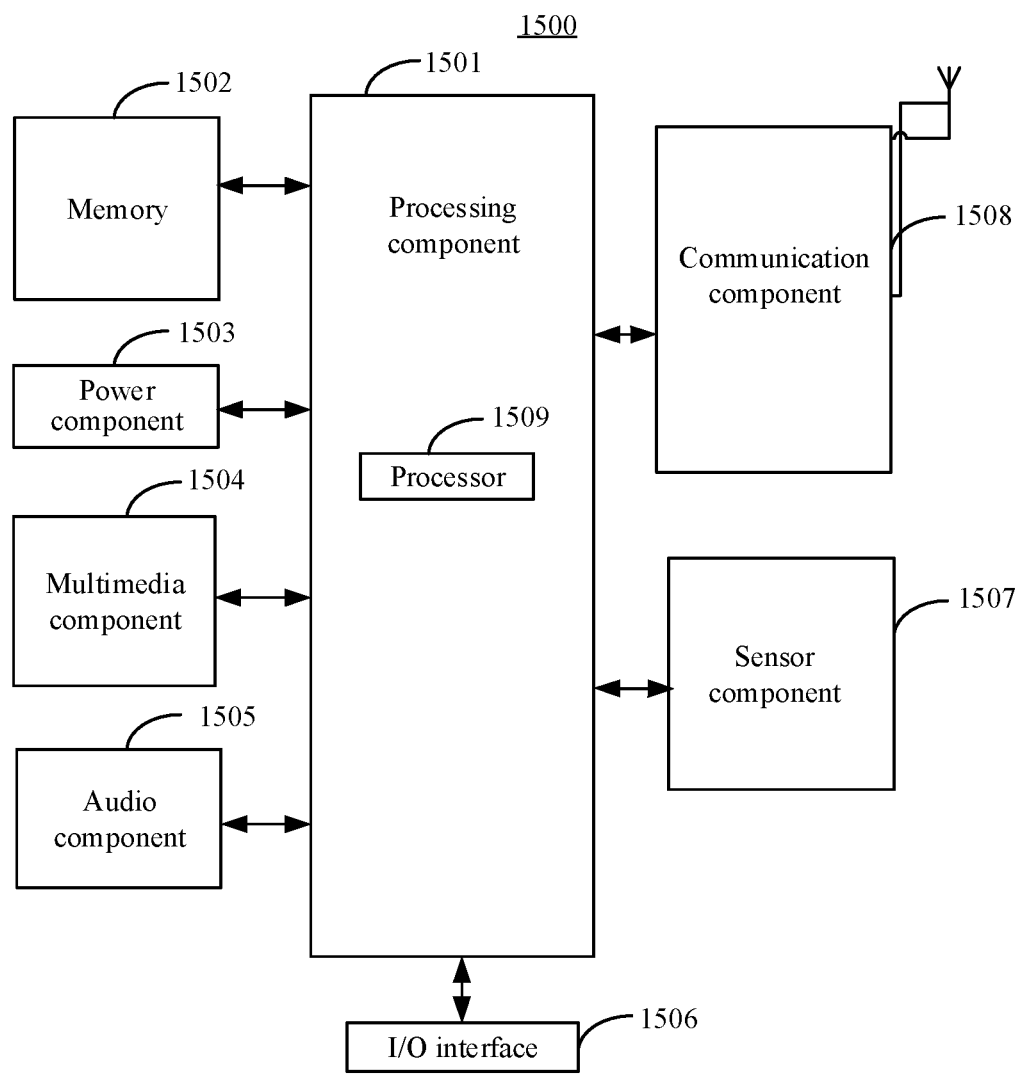
FIG. 15 is a schematic structure diagram of another device for receiving a DRS according to an exemplary embodiment of the present disclosure.

FIG. 15 is a schematic structure diagram of a device for receiving a DRS according to an exemplary embodiment. As shown in FIG. 15, a device 1500 for receiving the DRS according to an exemplary embodiment is shown. The device 1500 may be a terminal in an unlicensed spectrum, such as a computer, a mobile phone, a digital broadcast terminal, a messaging device, a game console, a tablet device, a medical device, a fitness device, a personal digital assistant or the like.

Referring to FIG. 15, the device 1500 may include one or more of the following components: a processing component 1501, a memory 1502, a power component 1503, a multimedia component 1504, an audio component 1505, an input/output (I/O) interface 1506, a sensor component 1507, and a communication component 1508.

The processing component 1501 typically controls overall operations of the device 1500, such as the operations associated with display, telephone calls, data communications, camera operations, and recording operations. The processing component 1501 may include one or more processors 1509 to execute instructions to perform all or part of the operations in the abovementioned method. Moreover, the processing component 1501 may include one or more modules which facilitate interaction between the processing component 1501 and the other components. For instance, the processing component 1501 may include a multimedia module to facilitate interaction between the multimedia component 1504 and the processing component 1501.

The memory 1502 is configured to store various types of data to support the operation of the device 1500. Examples of such data include instructions for any applications or methods operated on the device 1500, contact data, phonebook data, messages, pictures, video and the like. The memory 1502 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 1503 provides power for various components of the device 1500. The power component 1503 may include a power management system, one or more power supplies, and other components associated with generation, management and distribution of power for the device 1500.

The multimedia component 1504 includes a screen providing an output interface between the device 1500 and a user. In some embodiments, the screen may include a Liquid Crystal Display (LCD) and a Touch Panel (TP). If the screen includes the TP, the screen may be implemented as a touch screen to receive an input signal from the user. The touch panel includes one or more touch sensors to sense touches, swipes and gestures on the touch panel. The touch sensors may not only sense a boundary of a touch or swipe action but also detect a duration and pressure associated with the touch or swipe action. In some embodiments, the multimedia component 1504 includes a front camera and/or a rear camera. The front camera and/or the rear camera may receive external multimedia data when the device 1500 is in an operation mode, such as a photographing mode or a video mode. Each of the front camera and the rear camera may be a fixed optical lens system or have focusing and optical zooming capabilities.

The audio component 1505 is configured to output and/or input an audio signal. For example, the audio component 1505 includes a Microphone (MIC), and the MIC is configured to receive an external audio signal when the device 1500 is in the operation mode, such as a call mode, a recording mode and a voice recognition mode. The received audio signal may further be stored in the memory 1502 or sent through the communication component 1508. In some embodiments, the audio component 1505 further includes a speaker configured to output the audio signal.

The I/O interface 1506 provides an interface between the processing component 1501 and a peripheral interface module, and the peripheral interface module may be a keyboard, a click wheel, a button and the like. The button may include, but not limited to: a home button, a volume button, a starting button, and a locking button.

The sensor component 1507 includes one or more sensors configured to provide status assessment in various aspects for the device 1500. For instance, the sensor component 1507 may detect an on/off status of the device 1500 and relative positioning of components, such as a display and a small keyboard of the device 1500, and the sensor component 1507 may further detect a change in a position of the device 1500 or a component of the device 1500, presence or absence of contact between the user and the device 1500, orientation or acceleration/deceleration of the device 1500 and a change in temperature of the device 1500. The sensor component 1507 may include a proximity sensor, configured to detect presence of an object nearby without any physical contact. The sensor component 1507 may also include a light sensor, such as a Complementary Metal Oxide Semiconductor (CMOS) or Charge Coupled Device (CCD) image sensor, configured for use in an imaging application. In some embodiments, the sensor component 1507 may also include an acceleration sensor, a gyroscope sensor, a magnetic sensor, a pressure sensor or a temperature sensor.

The communication component 1508 is configured to facilitate wired or wireless communication between the device 1500 and another device. The device 1500 may access a communication-standard-based wireless network, such as a Wireless Fidelity (Wi-Fi) network, a 2nd-Generation (2G) or 3rd-Generation (3G) network, a 4rd-Generation Long Term Evolution (4G LTE) network, a 5rd-Generation New Radio (5G NR) network or a combination thereof. In an exemplary embodiment, the communication component 1508 receives a broadcast signal or broadcast associated information from an external broadcast management system through a broadcast channel. In an exemplary embodiment, the communication component 1508 further includes a Near Field Communication (NFC) module to facilitate short-range communication. For example, the NFC module may be implemented based on a Radio Frequency Identification (RFID) technology, an Infrared Data Association (IrDA) technology, an Ultra-Wide Band (UWB) technology, a Bluetooth (BT) technology and another technology.

In an exemplary embodiment, the device 1500 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the abovementioned method.

In an exemplary embodiment, there is also provided a non-transitory computer-readable storage medium including an instruction, such as the memory 1502 including an instruction, and the instruction may be executed by the processor 1509 of the device 1500 to implement the abovementioned method. For example, the non-transitory computer-readable storage medium may be a ROM, a Random Access Memory (RAM), a Compact Disc Read-Only Memory (CD-ROM), a magnetic tape, a floppy disc, an optical data storage device, and the like.

The instruction in the storage medium is executed by the processor to enable the device 1500 to execute any method for receiving a DRS applied to the terminal side in the unlicensed spectrum.

The technical solutions provided by the embodiments of the present disclosure may have the following beneficial effects.

In the embodiments of the present disclosure, when the DRS is set, the DRS may be set to occupy the first preset number of consecutive time symbols within one slot, and the first preset number is no more than 14. Meanwhile, the DRS is set to at least include one or two SSBs. By the above procedure, the method for setting the DRS in the unlicensed spectrum is proposed.

In the embodiments of the present disclosure, each SSB occupies four consecutive time symbols in the DRS. Further, a number of symbols occupied by the SSB included in the DRS is set, so that the availability is high.

In the embodiments of the present disclosure, the DRS further includes the second preset number of NZP CSI-RSs, each NZP CSI-RS occupies one time symbol in the DRS, and the second preset number is any integer value between 1 and 10. By the above procedure, in the unlicensed spectrum, the number of symbols occupied by each NZP CSI-RS included in the DRS and a number of NZP CSI-RSs included in one DRS are set, so that the availability is high.

In the embodiments of the present disclosure, the number of RMSI-CORESETs, RMSI-PDSCHs, OSI, and paging information included in the DRS and the number of time symbols occupied by each of the above information is also set, so that the availability is high.

In the embodiments of the present disclosure, when the RMSI-CORESET and the RMSI-PDSCH are included in each DRS, the last time symbol occupied by the RMSI-CORESET is located before the first time symbol occupied by the RMSI-PDSCH. Further, the last time symbol occupied by the RMSI-CORESET is located before the first time symbol occupied by the corresponding SSB; or the first time symbol occupied by the RMSI-CORESET is located after the last time symbol occupied by the corresponding SSB. By the above procedure, an order of the RMSI-CORESET and the RMSI-PDSCH in the DRS is set, and the RMSI-CORESET may be located before or after the corresponding SSB.

In the embodiments of the present disclosure, when each DRS includes not only the RMSI-CORESET and the RMSI-PDSCH, but also the OSI and/or the paging information, the RMSI-PDSCH should be located before the OSI and/or the RMSI-PDSCH should be located before the paging information. By the above procedure, when the DRS includes not only the RMSI-CORESET and the RMSI-PDSCH, but also the OSI and/or the paging information, an order corresponding to different information contents is further set.

In the embodiments of the present disclosure, the base station in the unlicensed spectrum may transmit one or more DRSs to the terminal within the periodic DRS measurement time configuration, and the DRS transmission time occupied by all the DRSs within the DMTC is no more than 5 milliseconds. Through the above process, the base station in the unlicensed spectrum may transmit the DRS periodically, thereby saving energy of the base station on the basis of ensuring that the terminal can acquire the DRS.

In the embodiments of the present disclosure, the base station may select one or two from multiple SSB candidate positions as the target transmission position of the SSB. Further, the SSB in the DRS are transmitted at the target transmission position, and the PBCH in the transmitted SSBs includes the SSB number corresponding to the target transmission position, which ensures that the terminal realizes downlink time domain synchronization subsequently.

In the embodiments of the present disclosure, the base station may perform channel detection before the DRS transmission time, and perform continuous DRS transmission within the DRS transmission time responsive to that the channel is detected to be idle. Further, the base station may configure the channel detection symbol before each DRS transmission in each slot within the DRS transmission time, perform channel detection through the channel detection symbol respectively, and transmit the DRS corresponding to the channel detection symbol responsive to that the channel is detected to be idle. By the above procedure, it is ensured that the DRS is able to be transmitted to the terminal responsive to that the channel is idle.

In the embodiments of the present disclosure, the terminal may receive one or more DRSs transmitted by the base station within the periodic DMTC, and the DRS transmission time occupied by all the DRSs within the DMTC is no more than 5 milliseconds. Therefore, energy of the base station may be saved on the basis of ensuring that the terminal can acquire the DRS.

Other implementation solutions of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

The invention claimed is:

1. A method for setting a discovery signal (DRS), comprising:
   setting the DRS to occupy a first preset number of consecutive time symbols within one slot, the first preset number being no more than 14; and
   setting the DRS to comprise one or two synchronization signal blocks (SSBs);
   wherein the DRS further comprises only one non-zero power channel state information-reference signal (NZP CSI-RS), and the NZP CSI-RS occupies one time symbol in the DRS;
   wherein the DRS further comprises a remaining minimum system information-Control Resource Set (RMSI-CORESET) and a RMSI-physical downlink shared channel (RMSI-PDSCH), the RMSI-CORESET occupies a third preset number of consecutive time symbols in the DRS and the RMSI-PDSCH occupies 4 consecutive time symbols in the DRS, the third preset number is an integer value between 1 and 3, and DRS transmission time occupied by the DRS within a periodic DRS measurement time configuration (DMTC) is no more than 5 milliseconds.

2. The method of claim 1, wherein each SSB occupies four consecutive time symbols in the DRS.

3. The method of claim 1, wherein a last time symbol occupied by the RMSI-CORESET is located before a first time symbol occupied by the RMSI-PDSCH.

4. The method of claim 3, wherein the last time symbol occupied by the RMSI-CORESET is located before a first time symbol occupied by a corresponding SSB; or
   a first time symbol occupied by the RMSI-CORESET is located after a last time symbol occupied by the corresponding SSB.

5. The method of claim 1, wherein the DRS further comprises at least one of following parameters:
   other system information (OSI), wherein the OSI occupies a fifth preset number of consecutive time symbols in the DRS; or
   paging information, wherein the paging information occupies a sixth preset number of consecutive time symbols in the DRS,
   wherein the fifth preset number is an integer value between 2 and 10, and the sixth preset number is an integer value between 2 and 10.

6. The method of claim 5, wherein the fifth preset number is 2 or 4, and the sixth preset number is 2 or 4.

7. The method of claim 5, wherein:
   a last time symbol occupied by the RMSI-PDSCH is located before a first time symbol occupied by the OSI; or
   the last time symbol occupied by the RMSI-PDSCH is located before a first time symbol occupied by the paging information.

8. A method for transmitting a discovery signal (DRS), the DRS being set by the method of claim 1, comprising:
   transmitting, a base station in an unlicensed spectrum, one or more DRSs to a terminal within a periodic DRS measurement time configuration (DMTC), DRS transmission time occupied by all DRSs within the DMTC being no more than 5 milliseconds.

9. The method of claim 8, further comprising:
   selecting, from multiple synchronization signal block (SSB) candidate transmission positions, one or two positions as a target transmission position of an SSB; and
   transmitting the SSB at the target transmission position, a physical broadcast channel (PBCH) in the transmitted SSB comprising an SSB number corresponding to the target transmission position.

10. The method of claim 9, further comprising:
    performing channel detection before the DRS transmission time, and performing continuous DRS transmission within the DRS transmission time responsive to detecting that a channel is idle.

11. The method of claim 10, further comprising:
configuring a channel detection symbol before each DRS transmission in each slot within the DRS transmission time, performing channel detection through the channel detection symbol respectively, and transmitting a DRS corresponding to the channel detection symbol responsive to detecting that the channel is idle.

12. A method for receiving a discovery signal (DRS), the DRS being set by the method of claim 1, comprising:
receiving, by a terminal in an unlicensed spectrum, one or more DRSs transmitted by a base station within a periodic DRS measurement time configuration (DMTC), DRS transmission time occupied by all DRSs within the DMTC being no more than 5 milliseconds.

13. The method of claim 12, further comprising:
determining a time domain position corresponding to a synchronization signal block (SSB) in the DRS according to an SSB number indicated by a physical broadcast channel (PBCH) in the SSB.

14. A device for setting a discovery signal (DRS), comprising:
a processor; and
memory for storing executable instructions of the processor;
wherein the processor is configured to:
set the DRS to occupy a first preset number of consecutive time symbols within one slot, the first preset number being no more than 14; and
set the DRS to comprise one or two synchronization signal blocks (SSBs);
wherein the DRS further comprises only one non-zero power channel state information-reference signal (NZP CSI-RS), and the NZP CSI-RS occupies one time symbol in the DRS;
wherein the DRS further comprises a remaining minimum system information-Control Resource Set (RMSI-CORESET) and a RMSI-physical downlink shared channel (RMSI-PDSCH), the RMSI-CORESET occupies a third preset number of consecutive time symbols in the DRS and the RMSI-PDSCH occupies 4 consecutive time symbols in the DRS, the third preset number is an integer value between 1 and 3, and DRS transmission time occupied by the DRS within a periodic DRS measurement time configuration (DMTC) is no more than 5 milliseconds.

15. The device of claim 14, wherein the DRS further comprises at least one of following parameters:
other system information (OSI), wherein the OSI occupies a fifth preset number of consecutive time symbols in the DRS; or
paging information, wherein the paging information occupies a sixth preset number of consecutive time symbols in the DRS,
wherein the fifth preset number is an integer value between 2 and 10, and the sixth preset number is an integer value between 2 and 10.

* * * * *